(12) United States Patent
Gao et al.

(10) Patent No.: US 8,189,037 B2
(45) Date of Patent: May 29, 2012

(54) VARIOUS CONFIGURATIONS OF THE VIEWING WINDOW BASED 3D DISPLAY SYSTEM

(75) Inventors: Chunyu Gao, Santa Clara, CA (US);
Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 94 days.

(21) Appl. No.: 12/725,684

(22) Filed: Mar. 17, 2010

(65) Prior Publication Data
US 2011/0228042 A1 Sep. 22, 2011

(51) Int. Cl.
*H04N 13/04* (2006.01)
(52) U.S. Cl. ......................................... 348/51
(58) Field of Classification Search .............. 348/51–57; H04N 13/04
See application file for complete search history.

(56) References Cited

U.S. PATENT DOCUMENTS

| | | | |
|---|---|---|---|
| 5,012,274 A | 4/1991 | Dolgoff | |
| 5,130,794 A * | 7/1992 | Ritchey | 348/39 |
| 5,495,576 A * | 2/1996 | Ritchey | 345/420 |
| 5,712,732 A * | 1/1998 | Street | 359/630 |
| 5,886,675 A * | 3/1999 | Aye et al. | 345/7 |
| 6,011,580 A | 1/2000 | Hattori et al. | |
| 6,101,008 A * | 8/2000 | Popovich | 359/15 |
| 6,459,532 B1 | 10/2002 | Montgomery et al. | |
| 6,843,564 B2 * | 1/2005 | Putilin et al. | 353/7 |
| 7,349,104 B2 | 3/2008 | Geng | |
| 7,400,447 B2 | 7/2008 | Sudo et al. | |
| 7,532,225 B2 | 5/2009 | Fukushima et al. | |
| 7,636,088 B2 | 12/2009 | Nomura et al. | |
| 2009/0017424 A1 * | 1/2009 | Yoeli et al. | 434/44 |
| 2009/0219381 A1 * | 9/2009 | Ayala | 348/43 |

\* cited by examiner

*Primary Examiner* — Tung Vo
(74) *Attorney, Agent, or Firm* — Rosalio Haro

(57) ABSTRACT

A panoramic 3D image is created by using multiple projectors whose field-of-view is narrower than the screen's width. Each projector provides a different image of a common subject from a different view angle, and the different images are mosaiced onto the screen. An observer may have a limited view of the composite image depending on which projectors are within the observer's field-of-view. A viewing volume is also extended by using space beyond a far limit line dependent upon the observer's inter-pupillary distance, the width of each projector's viewing window, and the distance from the projection baseline to the screen.

18 Claims, 16 Drawing Sheets

_VARIOUS CONFIGURATIONS OF THE VIEWING WINDOW BASED 3D DISPLAY SYSTEM_

BACKGROUND

1. Field of Invention

The present invention pertains generally to displays, and relates more particularly to wide-view-area and wide-view-screen autostereoscopic three-dimensional (3D) displays.

2. Description of Related Art

Traditionally, stereoscopic, i.e. 3D, images are created by aid of headgear that control viewing of separate left and right stereoscopic images by the left and right eyes, respectively, of a viewer. Each of the left and right images displays the same scene from slightly shifted viewing angles that closely match the viewing angles of a viewer's eyes. By conveying the separate left and right images to the viewers left and right eyes with viewing angles closely matching each eye's normal viewing angle, an illusion of a 3-Dimensional, i.e. 3D, display is created for the viewer.

Although this approach is effective, the required headgear (such as head-mounted displays or glasses with specialized lenses for rejecting specific angle views) makes this approach cumbersome. An alternative to using headgear is to use autostereoscopic displays, i.e. specialized displays that display select images at specific view angles such that only by viewing the display at a specific view angle can one view a select image. Theses specific view angles are typically termed "viewing windows".

Autostereoscopic displays use special light directing devices to create separate viewing windows in the user's space, which allow the user to see 3D images without glasses. Since the designated viewing windows form a viewing space that is significantly larger than the size of the human eye, users can move their heads freely as long as their eyes are within the viewing space.

Current stereoscopic methods used to produce the viewing windows include parallel-barrier-based displays and lenticular-based displays.

Parallel-barrier displays use light blocking to produce viewing windows, but this approach results in a dimmer image since only a small amount of light emitted from each pixel passing through the barrier window. Overlap of viewing areas causes crosstalk causing one eye to see the image intended for the other eye. When crosstalk is significant, the one cannot perceive the stereo effect or cannot perceive it correctly. Parallel-barrier displays also use small apertures that can cause diffraction, particularly as the display resolution is increased. As the display resolution increases, the barrier aperture size is decreased, which causes more severe diffraction effects. Parallel-barrier displays divide the resolution of the original display by the number of views such that to display n views, the resolution of the individual view becomes 1/n of the original display resolution. Parallel-barrier displays suffer from dark pixel lines due to each view seeing only one pixel column out of n associated with one barrier window.

Lenticular-based displays offer some improvements over parallel-barrier-based displays. Lenticular-based displays offer higher resolution compared with the barrier slits of parallel-barrier-based displays, but they are generally more difficult and costly to make due to the need for high quality lenticular sheets. Generally, the quality of the lenticular-based display is directly related to the quality of the lenticular sheet used in the display. Aligning a lenticular sheet with a display also requires significant effort. Although lenticular-based displays offer benefits over parallel-barrier-based displays, lenticular-based displays also suffer from crosstalk between view windows, dark line problem, limited resolution, and limit number of viewing windows.

SUMMARY OF INVENTION

It is an object of the present invention to create a retro-reflective display with increased viewing area.

It is another object of the present invention to present a wide-screen, retro-reflective display.

It is still a further object of the present invention to apply the increased viewing area and wide-screen display to the creation of stereoscopic, multi-view 3D displays The above objects are met in a system for creating a 3D panoramic projected image, having: a plurality of projectors along a line, the plurality of projectors defining a projection baseline, each projector in the plurality of projectors provides a shifted view of a common subject from a different view angle; a screen having a width wider than the field-of-view any individual projector in the plurality of projectors; wherein the projectors are arranged so that the images provided by adjacent projectors are partially overlapped on the screen and are geometrically aligned, the projected image from each adjacent projector along the projection baseline are shifted along a common direction on the screen, the plurality of projectors having an absence any photometric alignment from one projector to another.

In this system, an image projected by any one of the plurality of projectors spans a fraction of the width of the screen, and the partially overlapping images from the plurality of projectors create one composite image substantially spanning the width of the screen. This fraction does not span the entire width of the composite image.

Preferably each projector in the plurality of projectors provides a distinct image of a common subject, each distinct image providing a different view angle of the subject, and no two projectors in the plurality of projectors provide the same image.

The above-described, partially overlapped images are preferably of equal size. Also, the projected image from each adjacent projector along the projection baseline are preferably shifted by a common fixed amount along the common direction on the screen.

Additionally, optical axis of each the plurality of projectors is normal to the screen. Furthermore, the plurality of projectors are preferably equadistant to the screen along the direction normal to the screen.

In an embodiment of the present invention, each projector in the projection baseline creates respective viewing window, and a viewing volume from where an observer may view the screen is expanded to beyond a far limit line, D, defined as $$D = \frac{d \times IPD}{W},$$

where W is the width of the viewing window, IPD is Inter-pupillary Distance of the observer, and d is the distance from the projection baseline to the screen.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The presently preferred embodiment makes use of a retro-reflective vertical light diffusion screen. Such a screen is typically comprised of two layers: a first layer of a one-dimensional (1D) light diffusion material (which has a small diffusion angle in one direction and a large diffusion angle in another direction) and a second layer of a retro-reflective material (which reflects light rays back at their respective incident angle).

Figure 1:
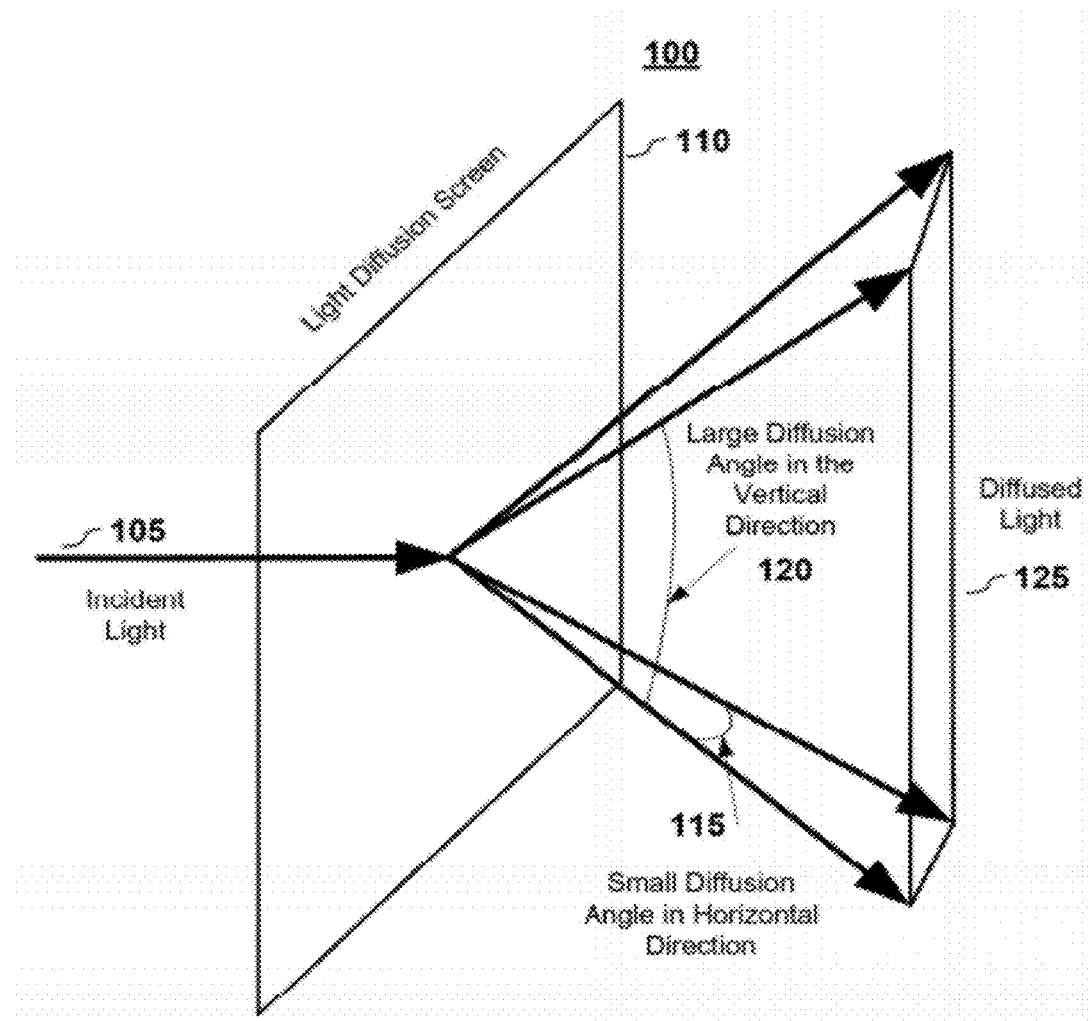
FIG. 1 illustrates the operation of a light diffusion screen.

With reference to FIG. 1, the first layer 100 consists of a light diffusing material 110. An incident light ray 105 that passes through light diffusing material 110 is diffused by a small angle 115 in the horizontal direction and diffused by a large angle 120 is the vertical direction. This creates a diffused light window 125. This type of diffusion screen can be referred to as a vertical light diffusion screen.

Figure 2:
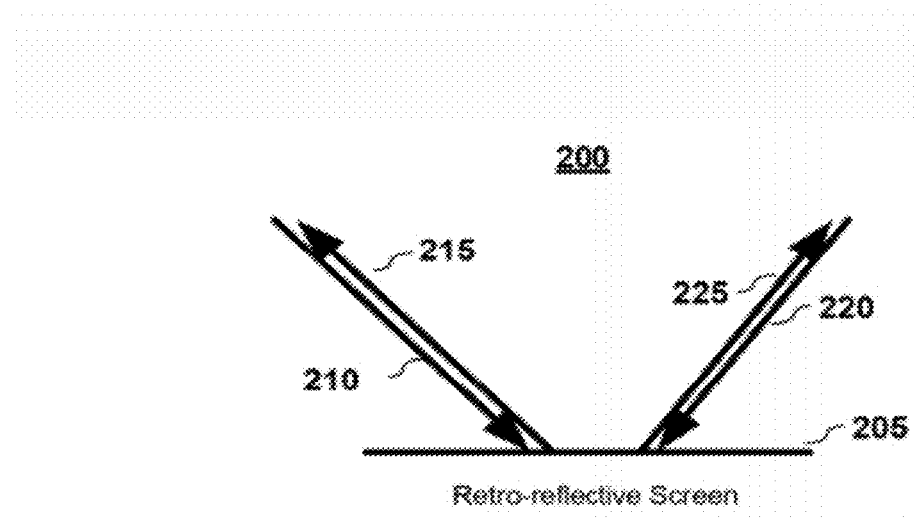
FIG. 2 illustrates the operation of a retro-reflective screen.

With reference to FIG. 2, the second layer of the retro-reflective vertical light diffusion screen includes a retro-reflective material 205. When an incident light ray, such as light rays 210 or 220, strikes retro-reflective material 205, it is reflected back at the same, or nearly the same, angle as its incident angle. For example, incident light ray 210 has a retro-reflective ray 215 that is reflected back along the direction (i.e. incident angle) of incident ray 210. Similarly, incident light ray 220 has a retro-reflective ray 225 that is reflected back along the direction of the incident ray 220.

Figure 3:
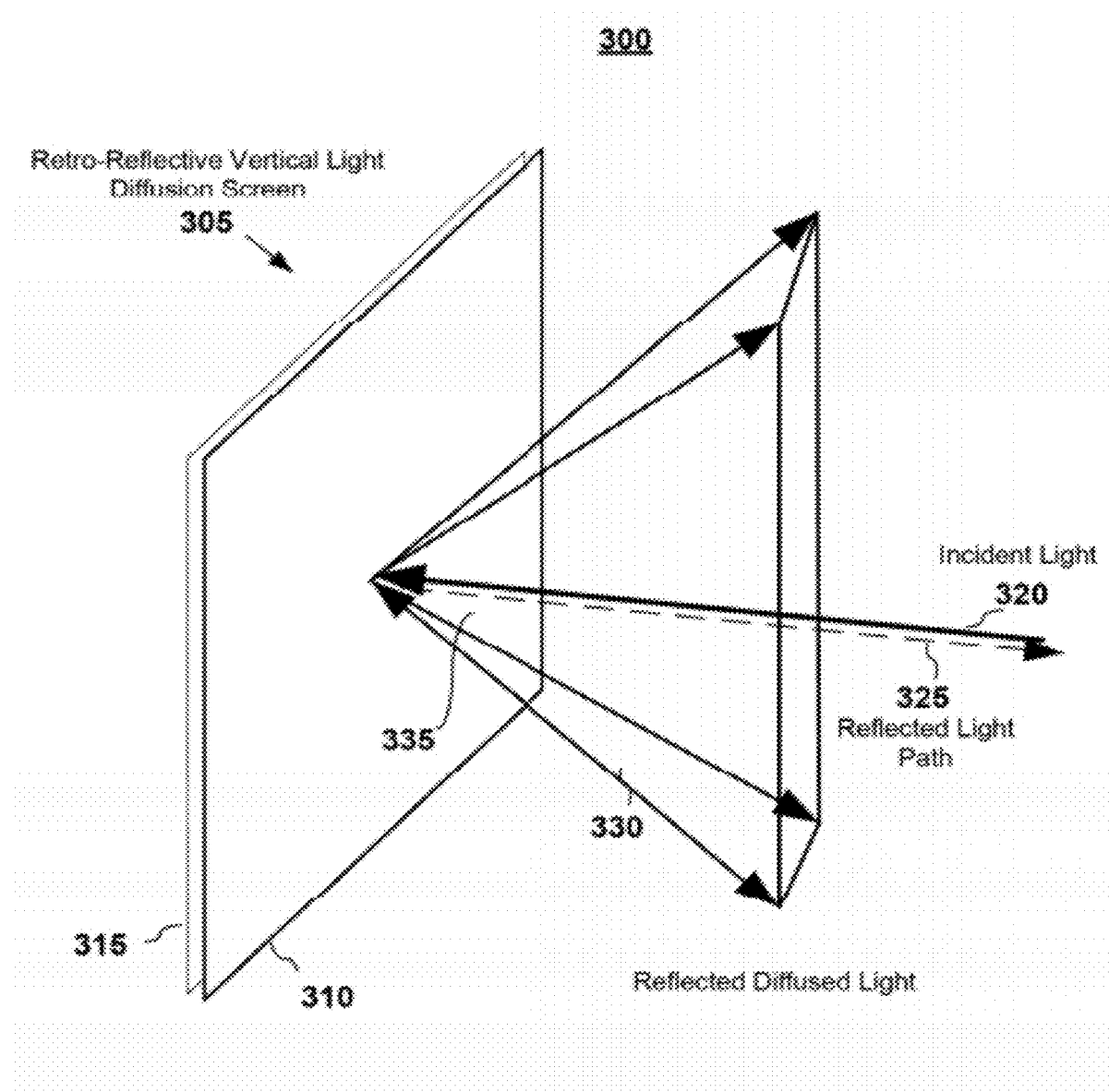
FIG. 3 illustrates the operation of a retro-reflective vertical light diffusion screen according to the present invention.

With reference to FIG. 3, a retro-reflective vertical light diffusion screen 305 is preferably formed of a one-dimensional light diffusion material 310 combined with a retro-reflective material 315. An example of a one-dimensional light diffusion material is Light Shaping Diffusers (LSD®) produced by Luminit LLC of Torrence, Calif. A light shaping diffusion material may have diffusion angles of 60°×1°, although one skilled in the art shall recognize that other diffusion angles may be used. Preferably, retro-reflective material 315 has a 60° diffusion angle in the vertical direction and a 1° diffusion angle in the horizontal direction. Examples of a retro-reflective material is 3M™ Scotchlite™ Reflective Material, produced by 3M Corporation of St. Paul, Minn., or photoelectric control products, such as P66 and AC1000 with metalized back produced by Reflexite Americas of New Britain, Conn.

As depicted in FIG. 3, in a system 300 in accord with the present invention, a light ray 320 directed toward the retro-reflective vertical light diffusion screen 305 passes through one-dimensional light diffusion material 310 and is reflected back along its incident direction 325 (or substantially along its incident direction) by retro-reflective material 315. One-dimensional light diffusion material 310 diffuses the retro-reflected light by a small amount in the horizontal direction 330 and by a large amount in the vertical direction 335.

Figure 4:
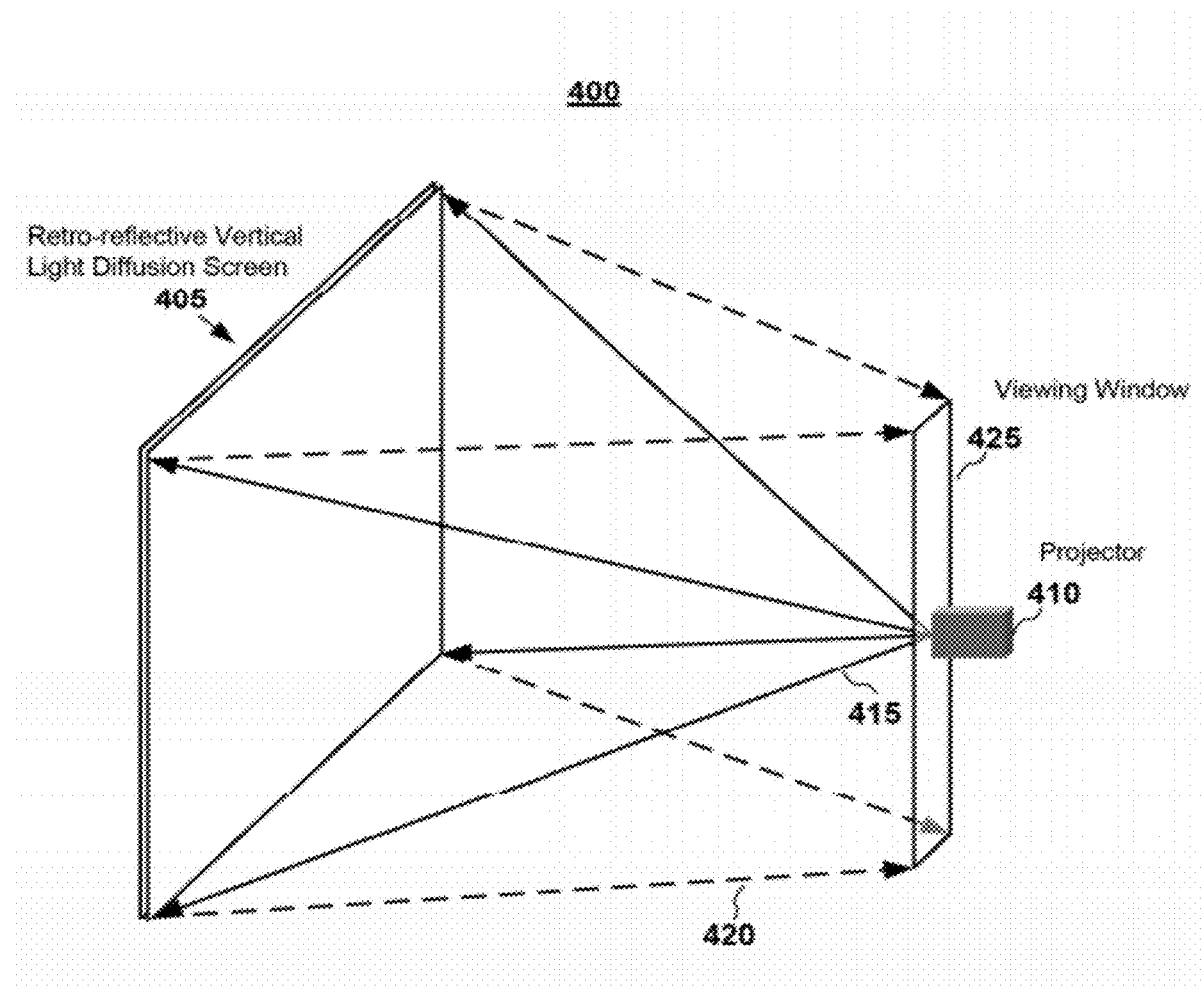
FIG. 4 illustrates a display system with a retro-reflective vertical light diffusion screen according to the present invention.

With reference to FIG. 4, a fundamental display system 400 in accord with the present invention includes a retro-reflective vertical light diffusion screen 405 and a projector 410. The retro-reflective vertical light diffusion screen 405 is used as a display screen. Light rays 415 emitted from projector 410 are retro-reflected back to the projector 410 and create a viewing window 425, which overlaps with projector 410. The screen 405 is configured such that the reflected light is diffused with a large diffusion angle in the vertical direction and with a small diffusion angle in the horizontal direction. Due to the vertical diffusion effect, the viewing window is a vertical slit, or viewing window, 425 centered with the aperture of the projection lens. The width of the viewing windows 425 is a function of the horizontal diffusion angle of screen 405, the distance from projector 410 to screen 405, and the aperture size of the projection lens. The width of viewing window 425 may be determined according to the following calculation:

$$W = D_a + 2 \cdot Z_p \cdot \tan\left(\frac{\varpi}{2}\right),$$

where
  W is the width of the slit;
  $D_a$ is the aperture size of the projection lens;
  $Z_P$ is the distance from the projector to the screen; and
  $\varpi$ is the horizontal diffusion angle of the screen.

It is noted that an advantage of having a large vertical diffusion angle is that the viewing window is extended vertically. Without a vertically extended viewing window, the viewing window 425 might coincide with the projector lens, thereby making it not possible for an individual to view the reflected image within viewing window 425. By extending the viewing window in a vertical direction, a user can view the image in viewing window 425 by viewing from a position either above or below projector 410. It is further noted that the reflected image does not appear stretched or distorted within viewing window 425. Viewing window 425 acts like slit, or opening in an otherwise opaque surface, through which a viewer may see screen 405 in its entirety. Viewing window 425 may be likened to an opening between the boards of a privacy fence through which all of screen 405 is visible.

Figure 5:
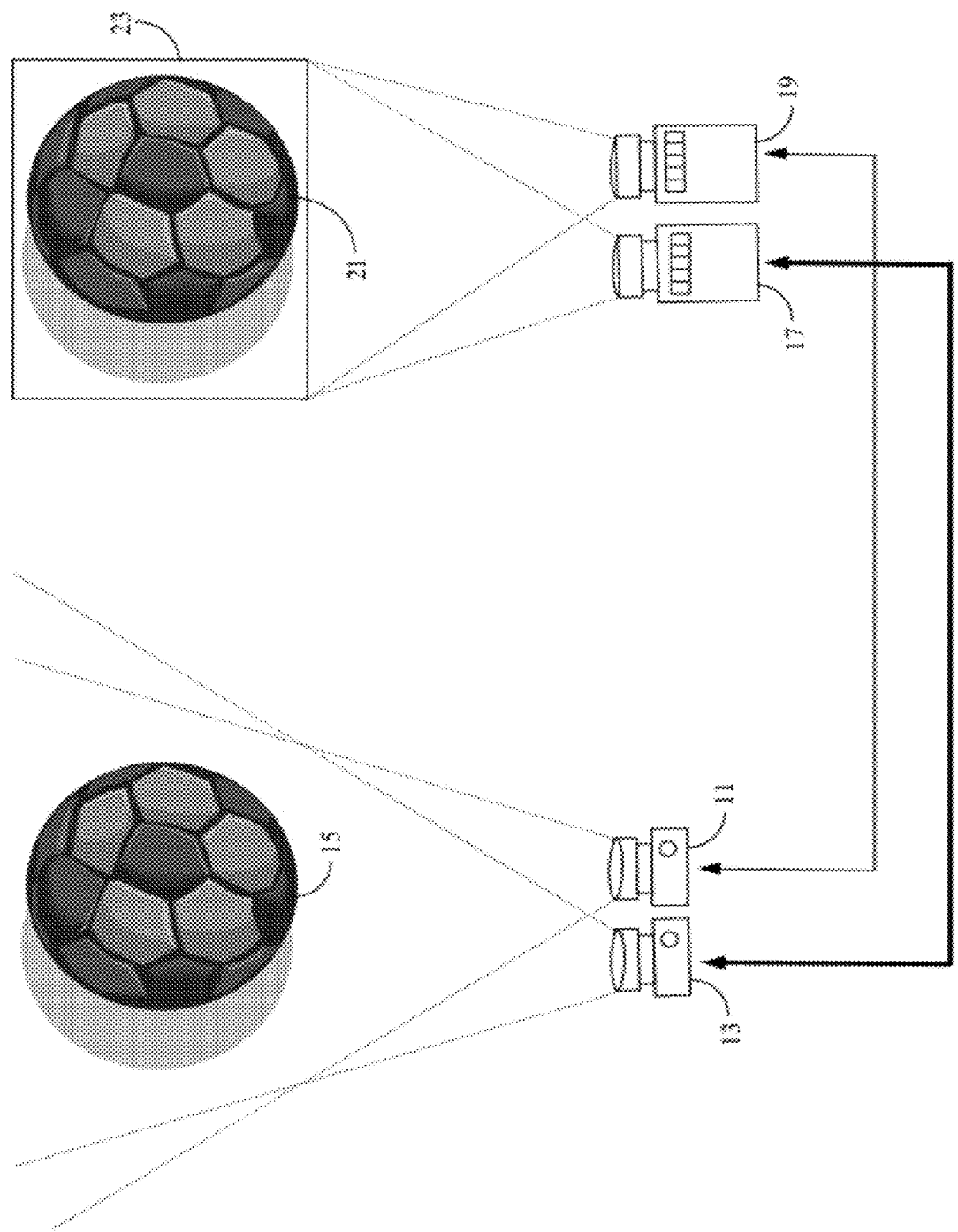
FIG. 5 show a system for creating a stereoscopic image of a subject by using two cameras to take two images of a common scene from two slightly different view angles.

With reference to FIG. 5, a stereoscopic image of a subject 15 may be created by using two cameras 11 and 13 to make two respective images of a common scene from two slightly different view angles. In other words, by placing cameras 11 and 13 adjacent each other with a separation similar to the separation between human eyes, cameras 11 and 13 can create images as viewed individually by a human's left eye and right eye. The separation of human eyes is typically within a range of 52 mm to 78 mm. Thus, by placing a separation of 52 mm to 78 mm between the capture lenses of cameras 11 and 12, a stereoscopic view may be made.

In the present example, cameras 11 and 13 are used to create respective images of a common subject, i.e. soccer ball 515. It is to be understood that cameras 11 and 13 may be still picture cameras or moving picture cameras (i.e. video cameras). Cameras 11 and 13 may further be embodied by a single 3-D camera enclosure.

A stereoscopic image 21 can then be created by using two projectors 17 and 19 to project image 21 onto a screen 23. In the present example, projector 17 projects the left-eye image created by camera 13, and projector 19 projects the right-eye image created by camera 11.

An issue remaining to be addressed is how to assure that the image projected by projector 17 is received by a viewer's left eye and not by his right eye, and how to assure that the image projected by projector 19 is received by the viewer's right eye and not his left eye. In the presently preferred embodiment, this is achieved by having screen 23 be a retro-reflective vertical light diffusion screen, and thereby creating a retro-reflective vertical light diffusion display system.

Figure 6:
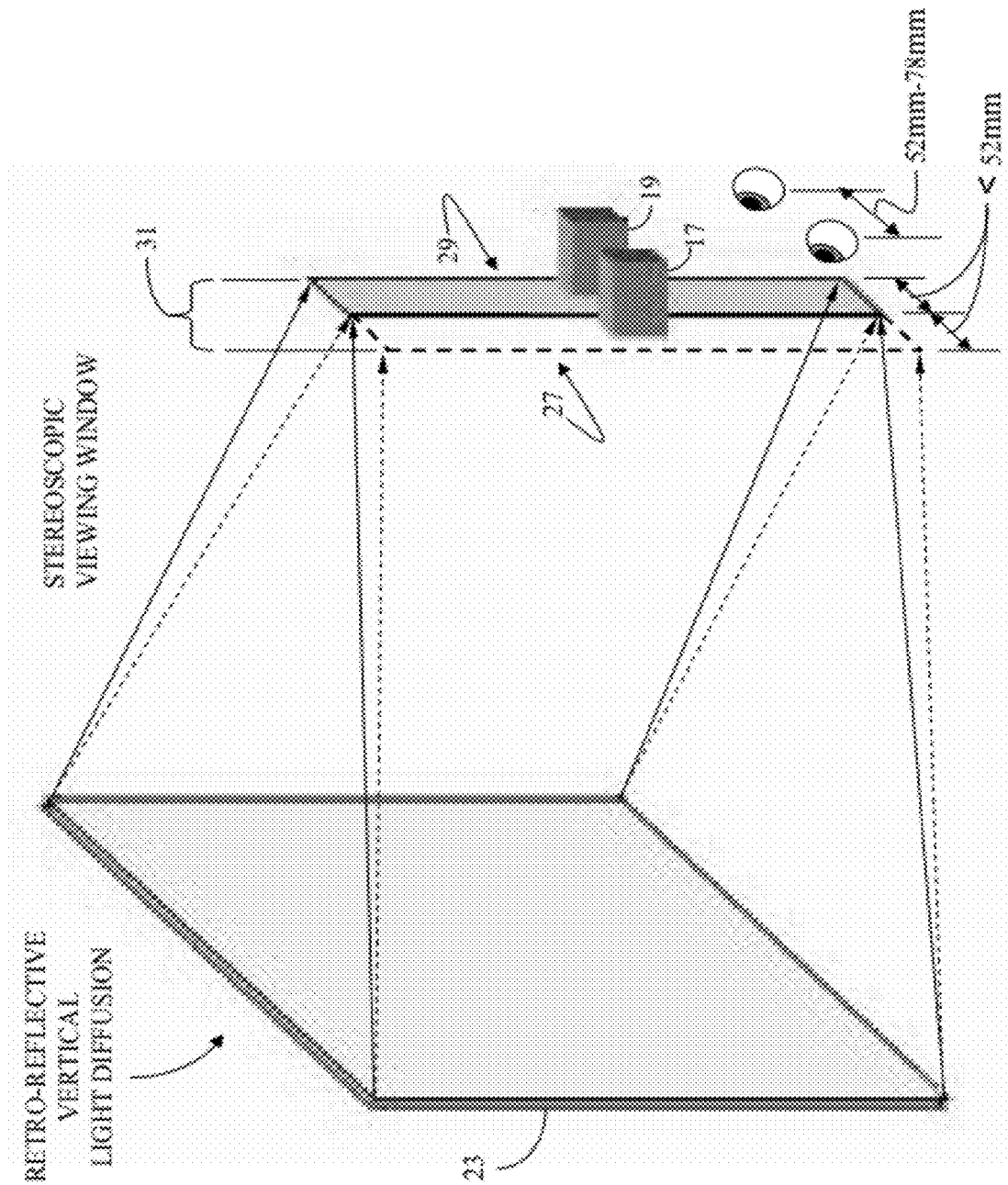
FIG. 6 is an example of a retro-reflective vertical light diffusion display system in accord with the present invention using two projectors to project a respective left-eye image and a right-eye image onto retro-reflective vertical light diffusion screen.

With reference to FIG. 6, where all elements similar to those of FIG. 5 have similar reference characters, an example of a retro-reflective vertical light diffusion display system in accord with the present invention may use two projectors 17 and 19 to project a respective left-eye image and a right-eye image onto retro-reflective vertical light diffusion screen 23. Due to the retro-reflective properties of screen 23, the left-eye image produced by projector 17 is reflected back towards projector 17 and creates a first viewing window 27. Similarly, the right-eye image produced by projector 19 is reflected back towards projector 19 and creates a second viewing window 29.

It is to be understood that each of viewing windows 27 and 29 produces a respective monoscopic image spanning the entirety of screen 23, but when viewed together, as is explained below, a stereoscopic image spanning the entirety of screen 23 may be produced. On the other hand, if only one projector were used, or if all projectors projected the same image, then a single monoscopic image would be produced since each viewing window would have the same monoscopic image.

As is explained above, the spacing between the eyes of a viewer, i.e. an observer, typically ranges from 52 mm to 78 mm. If it is desired to create a stereoscopic effect, it is further preferred that the projection lenses of projectors 17 and 19 be placed less than 52 mm apart (or alternatively be placed within the range of 52 mm to 78 mm). By spacing projectors 17 and 19 less than 52 mm apart, it becomes very likely that if an observer's left eye is within first viewing window 27 and thus viewing the left-eye image created by projector 17, then the observer's right eye will likely be within second viewing window 29 and thus viewing the right-eye image created by projector 19. In this manner, a stereoscopic viewing window 31 is created by combining two monoscopic viewing windows 27/29 from two adjacent projectors 17/19.

Figure 7:
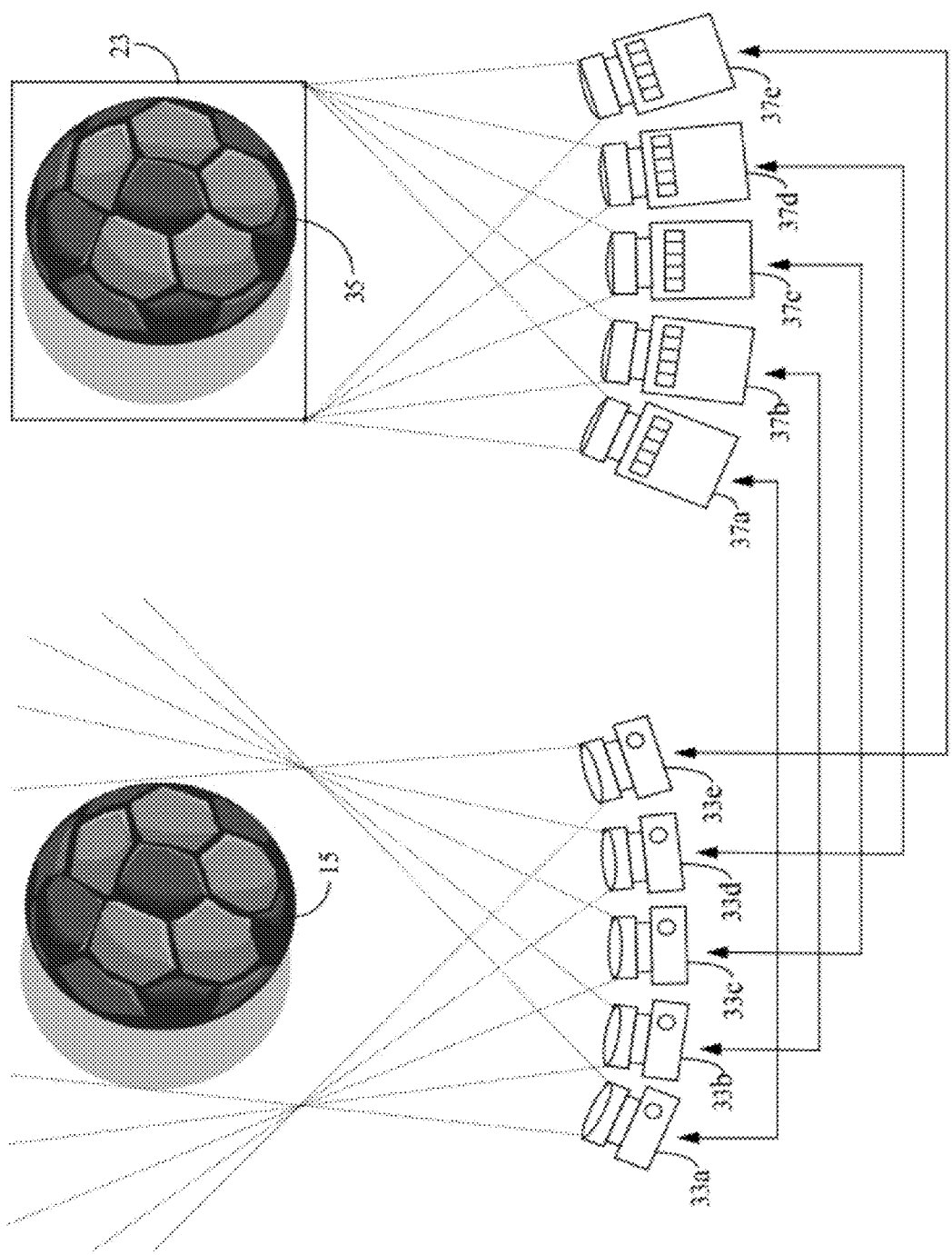
FIG. 7 illustrates an alternate embodiment of the present invention suitable for creating a multiscopic viewing area.

FIG. 7 illustrates an embodiment of the present invention suitable for creating a multiscopic viewing area. In the present case, multiple cameras 33a-33e are used to create five viewing windows, each with distinct images from five distinct viewing angles. Although the present example uses only five cameras to span the width of videoed (or photographed) subject 15, it is to be understood that a greater number of cameras may be used to span even wider subjects or to create finer view-angle images (i.e. narrower viewing windows) of the same subject. A multiscopic image 35 is then created by projecting the image from each of cameras 33a-33e by a corresponding projector 37a-37e having a similar placement arrangement as cameras 33a-33e. This creates five monoscopic viewing windows with five distinct viewing angles, and if an observer were to walk the span from projector 37a to projector 37e, the observer would see multiscopic image 35 from each of the five distinct viewing angles and appear to be walking by subject 15.

If desired, it may be preferred to increase the width of adjacent viewing windows (such as by increasing the spacing between the lenses of adjacent projectors) to be greater than the spacing between the observer's eyes so that the observer sees the same viewing window with both eyes. In this manner, the observer would perceive multiple monoscopic images of subject 515 from different view angles. Alternatively, the widths of adjacent viewing windows may be made smaller than the spacing between the observer's eyes so that the observer would perceive stereoscopic vision as the observer traversed the span all adjacent viewing windows.

Figure 8:
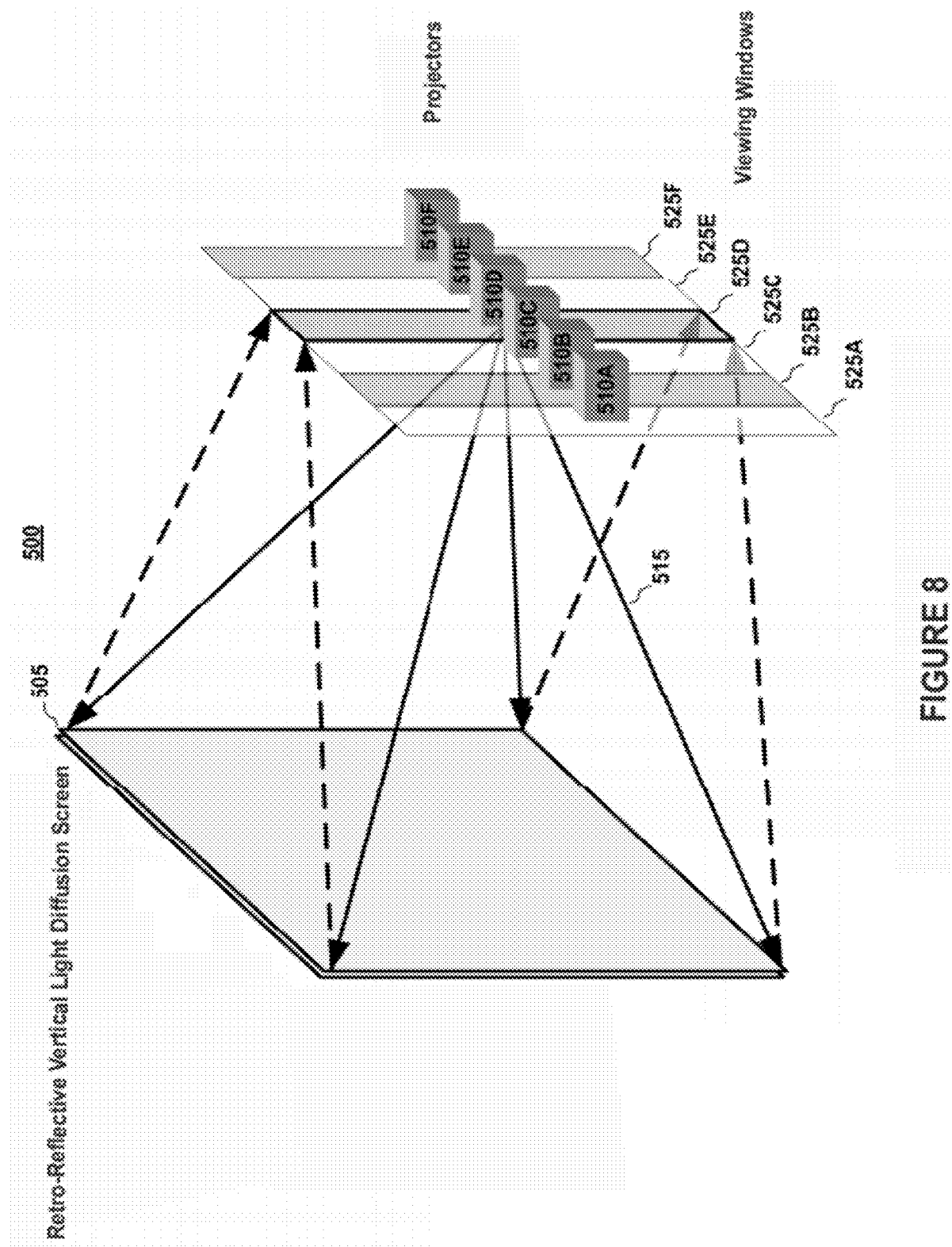
FIG. 8 shows that a multiscopic system in accord with the present invention may include a retro-reflective vertical light diffusion screen and a set of projectors.

With reference to FIG. 8, a multiscopic system 500 in accord with the present invention may include a retro-reflective vertical light diffusion screen 505 and a set of projectors 510A-F. It should be noted that although FIG. 5 depicts six projectors, additional or fewer projectors could be used. The retro-reflective vertical light diffusion screen 505 is used as the display screen in a similar manner as described with reference to FIG. 4. Namely, the light rays 515 emitted from any of projectors 510A-F are reflected back to the same projector from which the light rays originated and create a viewing window that overlaps with the same projector. For example, the light from projector 510A is reflected and diffused by the screen 505 to form viewing window 525A. This result is same for each projector in the display system 500, wherein each projector 510A-F generates a corresponding viewing window 525A-F, respectively. Thus, by adding more projectors, more such viewing windows are created.

The display system depicted in FIG. 5 generated six distinct viewing windows. Each viewing window displays an image from a corresponding projector. By displaying a set of images captured from multiple perspectives on the screen through the projectors, a user can see 3D through these viewing windows, or view slits. For example, if a user views one image in one viewing window with one eye and views another perspective image in another viewing window with user's other eye, then the user will perceive a 3D image. In some embodiments, the width of viewing window can be sufficiently small that a user does not perceive a monoscopic (i.e. monocular) image because both eyes cannot view the same viewing window at the same time.

One skilled in the art would recognize that there are several advantages to a display system of the kind depicted in FIG. 5.

First, the images are bright. Due to the one-dimensional light diffusion, a user will see an image that is much brighter than the image on a regular diffusion screen.

Second, the display screen can be configured into different shapes. Due to the retro-reflective property of the material, the screen shape could take arbitrary forms, such as regular planar, cylindrical shape, spherical shape, or almost any irregular shape. These shape variations do not affect the refocusing property of the retro-reflective screen.

Third, the display system is easily scalable. For example, more viewing windows can be generated by simply adding more projectors.

Fourth, the display system does not have the resolution limitations of prior solutions. Even though all the images are projected on the same screen, each image is only seen in the designated viewing window; therefore, the resolution can be as high as the resolution of the projector.

Fifth, the display system does not suffer from a picket fence effect, i.e. darkened vertical lines between adjacent viewing windows. Because the user perceives one full resolution image from a single projector at each viewing window, there is no picket fence effect in the image.

Sixth, if the multiscopic system of FIG. 7 is implemented with one distinct viewing angle per projector, the display system does not suffer from an image flipping effect. In an alternate system where multiple adjacent pairs of projectors display the same stereo pair of images creating multiple viewing zones, the flipping effect occurs when a user moves his head across the viewing zones and perceives a right-eye image in his left eye and a left-eye image in his right eye. The system of FIG. 7 does not have repeated viewing zones with specific stereo pair images and therefore does not have image flipping problems. Rather, each viewing window displays a perspective view image and any pair of images forms a 3D view. For example, the viewing windows may have a progression of perspective view images, wherein any two images form a 3D view. Using this approach, the viewing windows may be made arbitrarily small since the observer does not been to pear through adjacent view windows. Since the collection of adjacent view windows creates one continuous panorama of views, any two view windows will create the correct view angle combinations to create a proper stereoscopic view.

Finally, the display system can potentially have an infinite number of viewing windows. Although theoretically the display system can generate an infinity number of viewing windows, the number of viewing windows that can be generated depends upon the horizontal diffusion angle of the diffusion material, the distance from the projector to the screen and the size of the projector.

As is explained above, the presently preferred embodiment is a retro-reflective display system that contains a projection module and a special screen, as shown in FIG. 4. Preferably, the projection module contains two projectors (as shown in FIGS. 5 and 6) or multiple projectors (as shown in FIGS. 7 and 8) and projects stereo 3D content (i.e. stereoscopic) or multiview 3D contents (i.e. multiscopic) on a special screen. The special screen, called a retro-reflective vertical light diffusion screen (RVLDS), has the special properties of light focus and directional light diffusion. Due to the focus property, the screen is able to form a viewpoint (i.e. viewing window) at the location of the projector if only one projector is used and multiple viewpoints (i.e. viewing windows) if multiple projectors are used. Due to the directional light diffusion property, the light is diffused with a large diffusion angle in the vertical direction and a small diffusion angle in the horizontal direction. As a result of this directional light diffusion, the viewpoints formed by the screen are extended in both vertical and horizontal direction to a vertical rectangular viewing window centered with the aperture of the projection lens. The width of the viewing window is a function of the horizontal diffusion angle of the screen, the distance from the projector to the screen, and the aperture size of the projection lens The following discussion is an analysis based on a presently preferred 3D display system. However, these results are also applicable to the other viewing window based systems discussed above, including the other viewing window 3D display systems.

Figure 9:
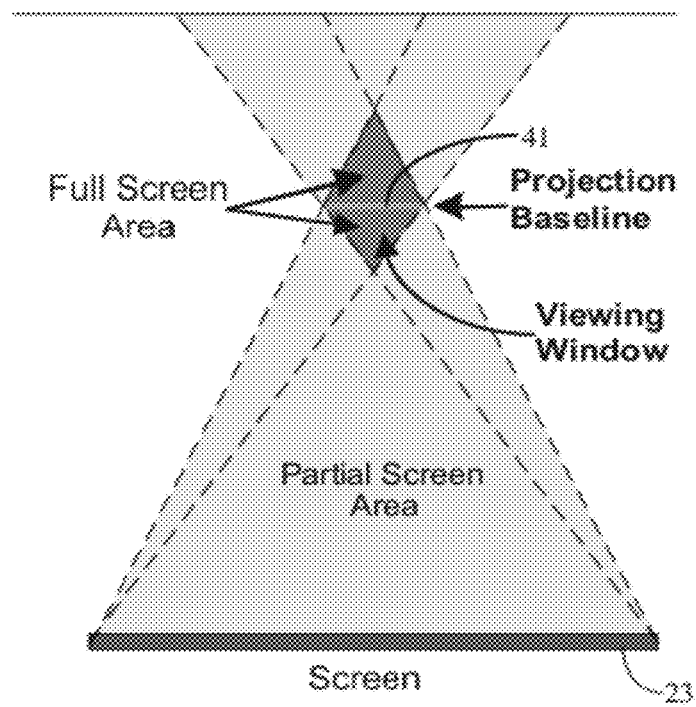
FIG. 9 shows the viewing volume of a one viewing window case.

In the above examples of viewing window based projection systems, the location of a projector (or a line of projectors) about which a viewing window (or multiple viewing windows) is created is hereafter identified as a viewing base line. For example, FIG. 9 shows a single viewing window 41. The darken area in front of, and behind, viewing window 41 identifies the "full screen area", i.e. the area from which the entirety of screen 23 is viewable through. The lightly shaded areas outlined by dash lines identify a "partial screen area", where only part of an image on screen 23 is viewable by an observer. In present case, the location of viewing window 41 defines the projection baseline.

In other words, FIG. 9 shows the viewing volume of a one viewing window case. An observer can see the full image on screen 23 through window 41 if only the observer's eye is located inside the diamond-shaped, full screen area (the dark grey region). The observer sees part of the image on screen 23 if his eye is outside the full screen area, but is within the partial screen area (i.e. the light grey region). If an observer's eyes are anywhere outside of the full screen area and partial screen area, then the observer would be unable to see any projected image on screen 23. Similarly, the viewing volume of the viewing window based 3D display system is determined by the width of the screen and projection baseline. The projection baseline is the line segment which contains all the viewing windows.

Figure 10:
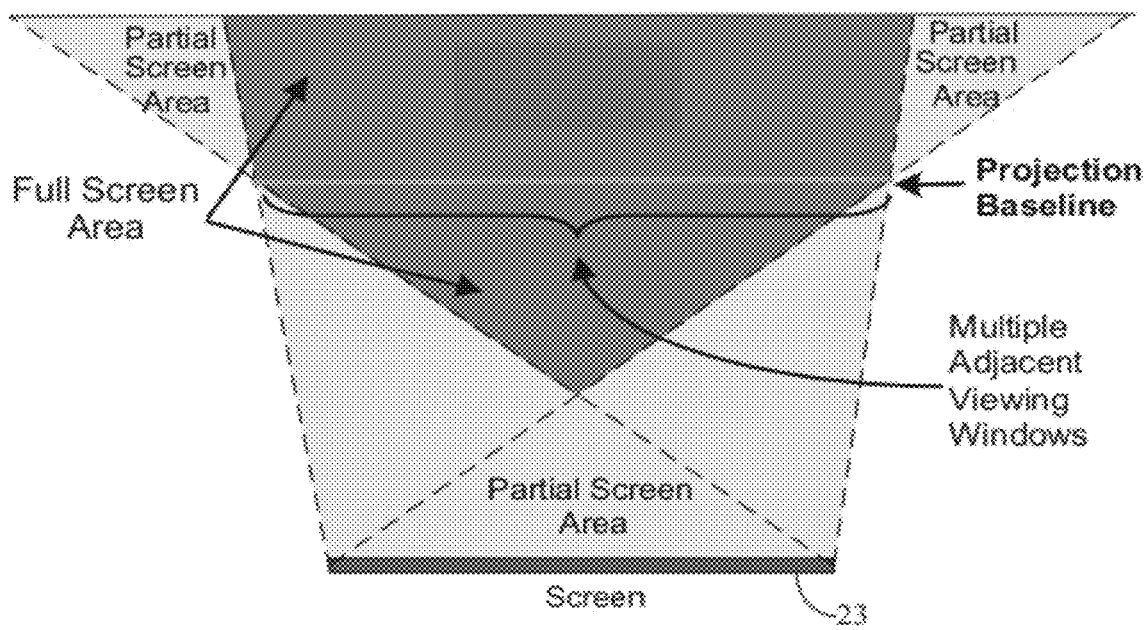
FIG. 10 shows a viewing base line wider than that of FIG. 10.

As second example, FIG. 10 shows a viewing base line wider than that of FIG. 9, and constructed by multiple adjacent viewing windows. As a result of the wider viewing base line, the full screen area is larger than that of FIG. 9. Like before, the partial screen area (i.e. the lightly shaded areas outlined by dash lines) highlight the areas where an observer (i.e. viewer) would be able to see only part of screen 23 through viewing windows. Outside the full screen area and the partial screen area, an observer would not be able to see a projected image on screen 23.

In other words, FIG. 10 shows the viewing volume of a multi-view case. Inside the dark grey, full screen area, the observer can see the full projected image on screen 23 through some, or all, of the viewing windows. Again, inside the light grey, partial screen area, the observer can see only part of the projected image on screen 23. Outside the full screen area and the partial screen area, the observer can not see any part of a projected image on screen 23.

The following is a discussion of how to modify the full screen area and partial screen area of a display system in accord with the present invention.

Figure 11:
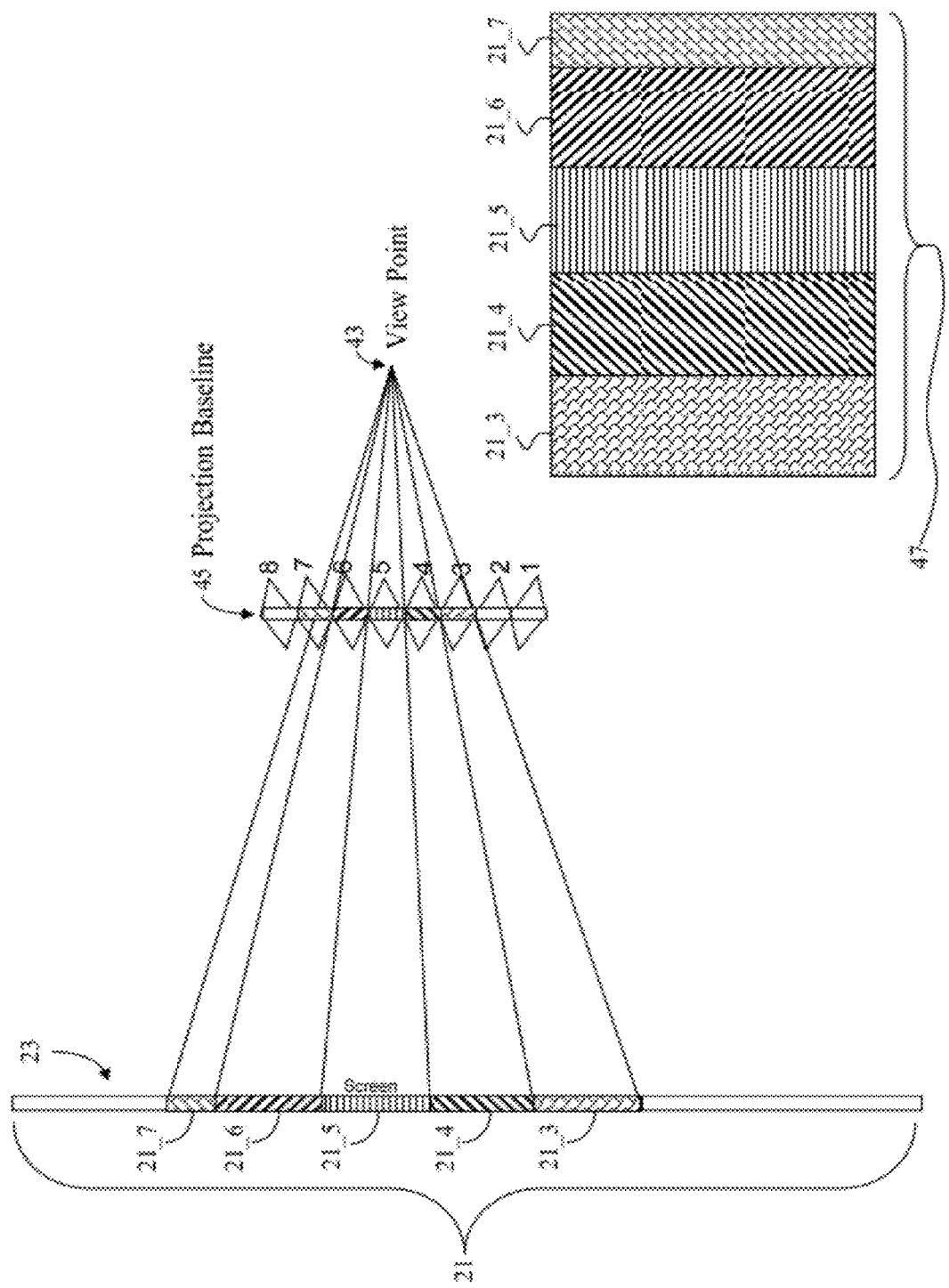
FIG. 11 illustrates a sample multi-view projection system that uses eight projectors (not shown) to create eight (rectangular) viewing windows, each with a corresponding diamond-shaped, full screen area surrounding it.

With reference to FIG. 11, a sample multi-view projection system uses eight projectors (not shown) to create eight (rectangular) viewing windows 1-8, each with a corresponding diamond-shaped, full screen area surrounding it. As is explained above, each of the eight projectors would create a corresponding image 21 spanning the entirety of screen 23. Each projector's respective image, however, is only viewable, in its entirety, from the projector's corresponding full screen area defined by its corresponding viewing window. The collection of viewing windows 1-8 comprises system's projection baseline 45. That is, on the projection baseline 45, within each full screen area (or corresponding viewing window 1-8), an observer sees a full image from a corresponding image source (i.e., the viewing window's corresponding projector, not shown).

However, when the observer is located behind, or in front of, the projection baseline, outside any of the full screen areas, as is indicated by exemplary view point 43, the observer's field-of-vision, FOV, may span multiple viewing windows. This is similar to an observer viewing screen 23 through multiple, adjacent, physical windows. Just as the observer's field-of-vision may have only a partial view of screen 23 through each physical window, so too an observer at view point 43 may have only a partial view of each viewing window's corresponding projected image. Furthermore, the field-of-vision from view point 43 may provide a view of screen 23 through only some of the viewing windows. In the present example, view point 43 provides a view of screen 23 through view windows 3-7, and only a part of view window 7 is visible from view point 43.

In the present example, the projected image corresponding to viewing windows 3 to 7 are labeled 21_3 to 21_7. It is to be understood that each of images 21_3 to 21_7 spans the entirety of screen 23, and each are superimposed upon each other, but due to the special qualities of screen 23 each projected image 21_3 to 21_7 is visible, individually, in its entirety from its corresponding viewing window 3-7.

The projected image visible through each viewing window may be distinct to each corresponding image, but since each viewing window provides a view of the same image subject from a different view angle, the resultant effect is a composite of the same image subject from different view angles corresponding to view point 43. That is, the resultant composite image 47, comprised from partial views (21_3 to 23_7) from each of viewing windows 3 to 7 is approximately equivalent to seeing screen 23 from a new perspective viewpoint at view point 43. In effect, the view from view point 43 approximates a new view angle.

In order to have 3D perception, the left eye and right eye of the observer must see two different images (i.e. a left-eye image and a right-eye image), commonly referred to as stereo pair. The multi-view projection system of FIG. 11 intrinsically provides stereo pair images to an observer since each viewing window provides a distinct view angle of the same image subject. There is, however, a limit to the range of locations wherein the multi-view projection system of FIG. 11 can provide stereo pair images.

Figure 12:
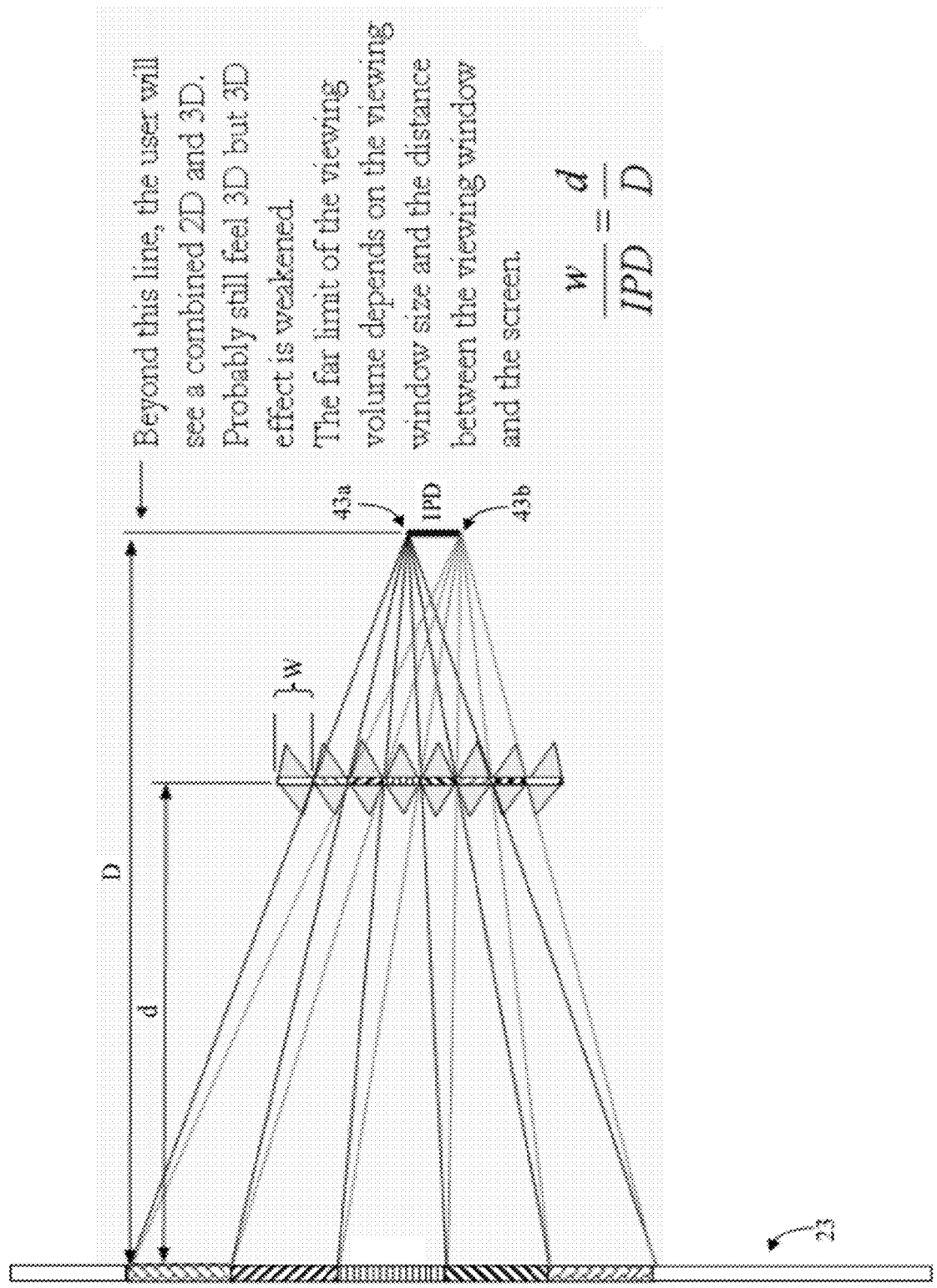
FIG. 12 shows two viewing points representing an observer's two eyes identifying the far limit, D, beyond which the observer's perceived 3D effect is weakened.
Figure 13:
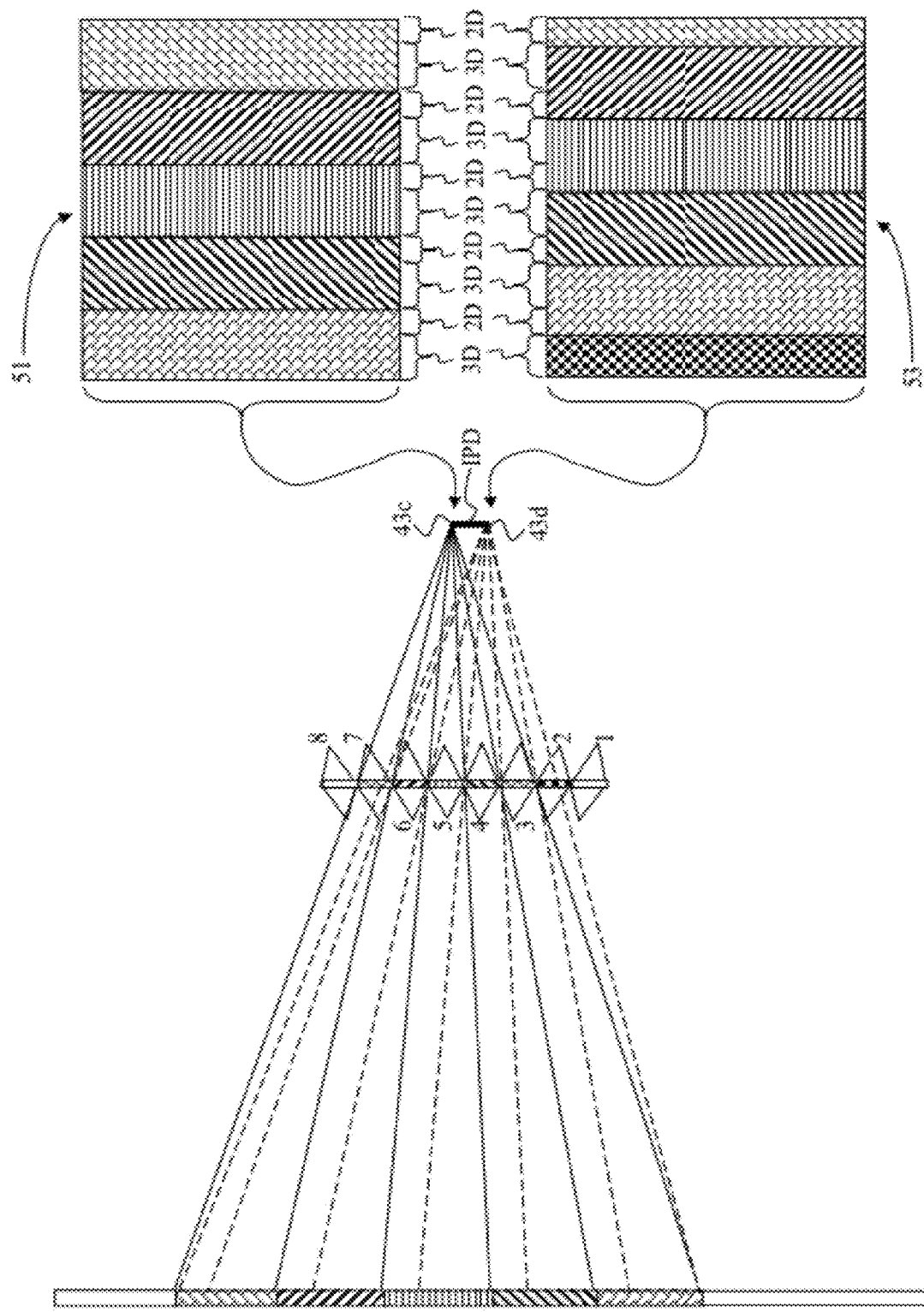
FIG. 13 illustrates how the far limit D may result in an observer perceiving a mixture of 2D and 3D images.

With reference to FIG. 12, two viewing points 43a and 43b representing an observer's two eyes identifying the far limit, D, from screen 23 beyond which the observer's perceived 3D effect may be weakened. The distance between view points 43a and 43b correspond to the distance between the observer's eyes, and is hereafter identified as the Inter-pupillary distance, IPD, of the observer. As shown, there exists a far limit, D, beyond which the observer may see a combined 2D and 3D image pair. Far limit D for the present multi-view system is given by:

$$D = \frac{d \times IPD}{W}$$

where:
W is the width of the viewing window;
IPD is Inter-pupillary Distance of the observer;
d is the distance from the projection baseline to the screen;
D is the far limit of the viewing volume;

In order to have 3D perception, the left eye and right eye of the observer must see two different images, i.e. the stereo pair. FIG. 13 illustrates how the far limit D may result in an observer perceiving a mixture of 2D and 3D images. All elements similar to those of FIGS. 11 and 12 have similar reference characters, and are described above. Two view points 34c and 34d again represent an observer's two eyes. In the present example, the left-eye viewpoint 34d has a FOV that passes through viewing windows 2 through 7, whereas the right-eye viewpoint 34c has a FOV that passes through viewing windows 3 through 7. The resultant image 51, as seen from viewpoint 43c, is a mosaic of partial views from viewing windows 3 through 7. By contrast, the resultant image 53, as seen from viewpoint 43d, is a mosaic of partial views from viewing windows 2 through 7. As a result, partial view regions that have identical patterns, meaning that the images are identical, will form 2D slices interpose between 3D slices, where the partial view regions have different patterns, meaning that the images are a stereo pair. An observer will not be able to perceive a 3D image if these 2D slices are seen alone. However, for this pair of combined 2D slices and 3D slices, the observer will still perceive a 3D image, although the 3D perception may be weakened by these 2D slices.

Hereinafter, regions where the full screen is till visible, but with a weakened 3D effect due to the combination of 3D slices and 2D slices, is identified as Weakened 3D. The following are two configurations for extending the viewing volume of a 3D projection system by making use of the Weakened-3D region.

The following addresses two cases: a first case for use with relatively small screens, such as used in a home environment; and a second case for use with large screens, such as used in large venues.

Figure 14:
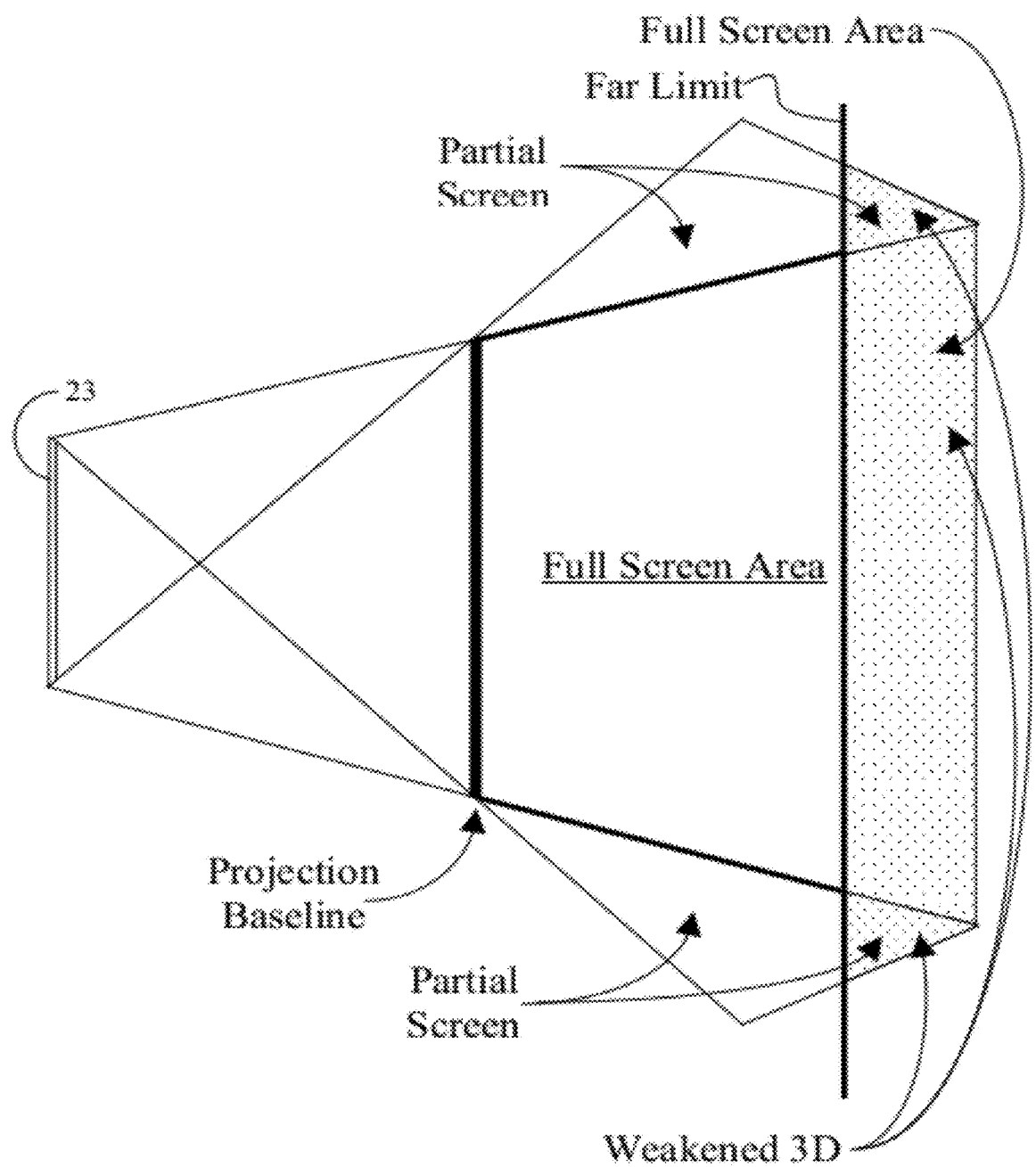
FIG. 14 shows a first case of having a small screen where a viewing arrangement is behind the projectors.

With reference to FIG. 14, the first case of having a small screen has a viewing arrangement behind the projectors. In this case, the projectors are typically of the small form factor type, and are placed relatively close to the screen 23. This creates small viewing windows, which define the projection baseline. The designated viewing volume is behind the projection baseline, and consists of a full screen area, from which the entirety of screen 23 is visible in 3D, and a partial screen area from which only part of screen 23 is visible. As is explained above, the far limit line demarcates the end of a full 3D viewing. Behind the far limit line is the weakened 3d area, where an observer perceives a combined 3D and 2D images, as is explained above in reference to FIG. 13. This configuration extends the viewing volume by incorporating the weakened 3D region, but since the projectors are close to the screen, the projected image size is small for a fixed projector FOV. This setup is thus suitable for a small group of audiences, such as in a home or small office environment, to view 3D contents in a small scale at close distance.

Figure 15:
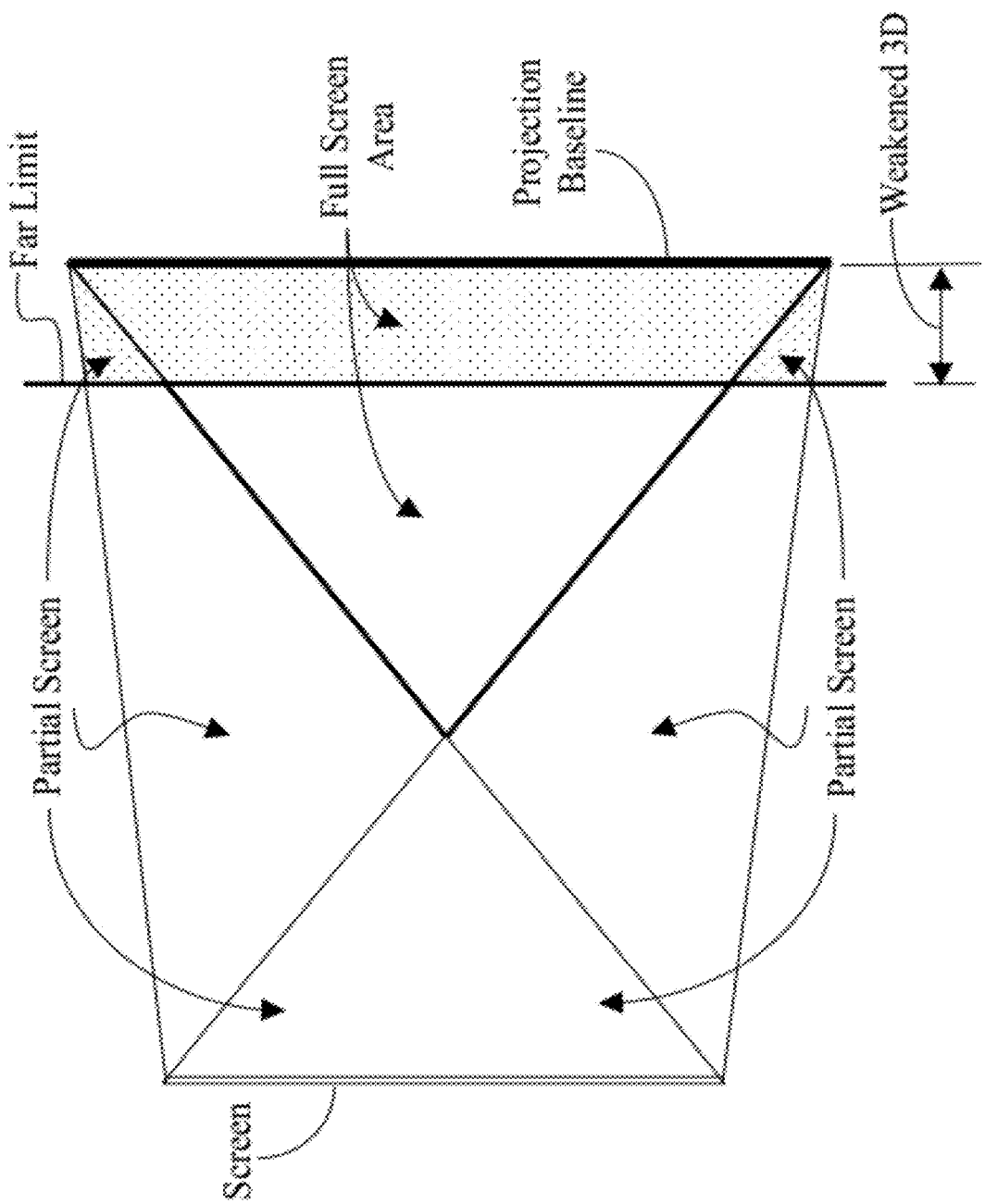
FIG. 15 shows a second case of having a large screen where a viewing arrangement in front of the projectors.

With reference to FIG. 15, the second case of having a large screen has a viewing arrangement in front of the projectors. In the present case, the projectors are placed far away from the screen, as denoted by the projection baseline, and the observers stand in front of the projectors to view 3D contents. The designated viewing volume is in front of the projection baseline, and the full screen area, from where the entire screen is visible in 3D, has a triangular shape. Beyond the full screen area, is the partial screen area from where an observer can still perceive a 3D effect, but the observer can only see part of the screen. The end of the full 3D viewing capability is again demarcated by the far limit line, which in the present case is in front of the projection baseline. Between the far limit line and the projection baseline is the weakened 3D region, from which an observer sees combined 3D and 2D images.

Since the projectors are placed far away from the screen and the viewing volume is in front of the projectors, the individual viewing window size can be bigger than the human IPD. Therefore, projectors of large size and high brightness can be used. The screen for this setup could be very big (depending on the projector FOV and projection distance), but the size is still limited since each projector must still cover the entire width of the screen. This setup is suitable for a large group of audiences to view 3D contents in large scale.

In all the above discussed embodiments, each projector in the multi-projector system must cover the entire screen. This limits the size of the screen by the FOV of the projectors, and their relative strength. Basically, the screen size is fixed once the FOV of the projectors are fixed. Adding more projector will only create more, and finer, viewing windows, and may extend the viewing volume, but will not affect the screen size.

The following builds on the above embodiments, but offers an alternative configuration of a viewing window based display system that creates a much wider 3D screen.

Figure 16:
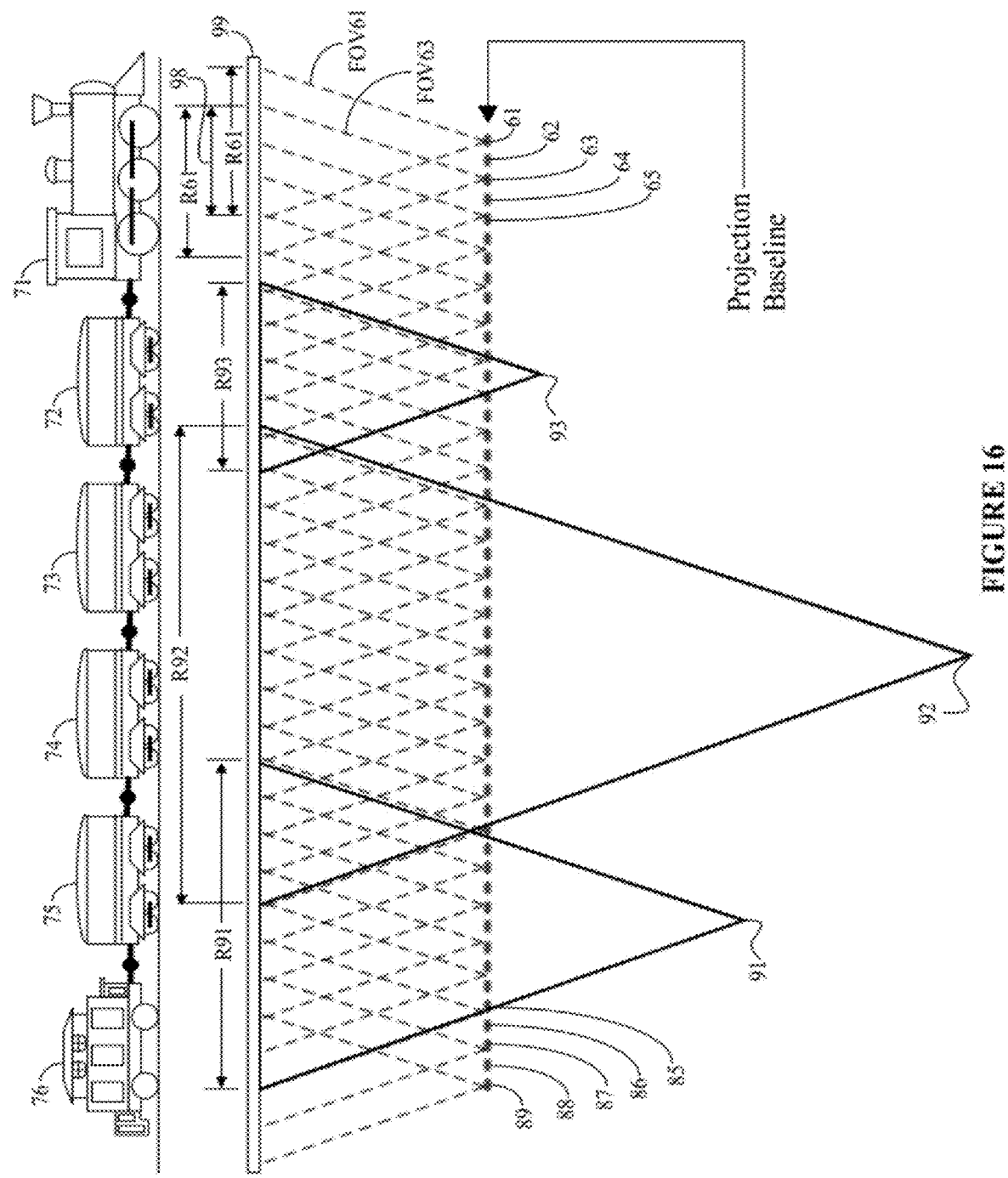
FIG. 16 shows a retro-reflective vertical light diffusion screen whose width is wider than the FOV any projector in the groups of projectors (shown as darken oval shapes) that make up the projection baseline.

With reference to FIG. 16, the present embodiment uses a retro-reflective vertical light diffusion screen 99 whose width is wider than the FOV any projector in the groups of projectors (shown as darken oval shapes) that make up the projection baseline (similar to that of FIGS. 7 and 8). For this new wide screen design, the projectors are arranged in a way that their optical axis are normal to screen 99, and unlike the above-discussed embodiments, the screen size (i.e. projected image size) is not limited by the FOV of any one individual projector. As a result, one can flexibly extend the screen width by adding more projectors. It is further preferred that projectors be equadistant to screen 99 along the direction normal to screen 99. That is, each projector is preferably spaced an equal distance away from screen 99, and each projector preferably produces an image of equal size on screen 99.

For example, for discussion purposes, it is assumed that a 3D image of a train is projected onto screen 99, and that the length of the train spans the width of screen 99. In the present example, the projection baseline is comprised of 49 projectors, and together, the 49 projectors provide 3D coverage of the width of screen 99. To achieve this, each projector provides only a part of the entire train image, and each part covers only a fraction of the entire image that spans the width of screen 99. Preferably, this fraction is does not span the width of the composite image.

For each of explanation, FOV lines are shown for alternate projectors to illustrate that each projector provides only a part of the entire train image, and that these parts overlap to create a composite of the entire train image. Each projector provides shifted image along a common direction, and each image is preferably shifted by a common, fixed amount.

In the present example, the train consists of one engine 71, four carts 72-75, and on caboose 76. Five projectors 61-65 provide the image of engine 71 at the front of the train, and five projectors 85-89 provide the image of caboose 76 at the end of the train. The other projectors in between provide the image for the rest of the train image between engine 71 and caboose 76.

For example, projector 61 has a field-of-view FOV61 that spans a region R1 at one end of screen 99, and provides an image that spans about three thirds of the length of engine 71 from its front end. Projector 63 has a field-of-view FOV63 that covers a region R61 of screen 99, and extends the image of engine 71 towards its end. The overlapped region 98 between projectors 61 and 63 provide are geometrically aligned so as to produce one continuous image without geometric distortion. However, due to the retro-reflective properties of screen 99, the overlap regions are not photometrically aligned. That is, since the image provided by each projector is reflected back to the same projector that produced it, there is no need to address any effects due to photometric properties (i.e. light-related properties, such as light intensity) of different images from different projectors being combined. This greatly simplifies the mosaicing of the multiple projectors along the projection baseline since once they have been geometrically aligned, no further adjustments are needed.

When viewed from behind the projection baseline, the present system's FOV is the same as the FOV of the individual projector. An observer standing behind the projection line will see only the part of screen 99 covered by the projectors within the observer's field-of-view. At different locations, the observer will see different parts of the screen. This is similar to the observer's real-life experience when standing close to a very wide object, such as a train. When the observer is close to the train, the observer can see only part of the train. In order to gain a broader view of the train, the observer would have to step back from the train some distance so as to fit the length of the train within his field-of-view. Similarly, the present embodiment, in order to obtain a wider view of screen 99, and hense of the prejected train, the observer needs to step back increase his field-of-view, or to walk the length of screen 99. As the observer walks along screen 99, he progresses from a first set of images provide by a first group of projectors to the next set of images provided by the next projectors along the projection line so that the observer has the sense of truly traversing the length of the train, or whatever image is provided on screen 99.

Three examples of the limited FOV of an observer are provided in FIG. 16. In a first example, an observer may be located at point 93, this would provide a field-of-view spanning three projectors, and the image visible to the observer from point 93 would be region R93 spanning the entirety of cart 72, but not providing any view of engine 71 or the carts in the train.

If the observer then steps back to location 91, then his FOV from this location will span 9 projectors, and the observer will have a wider view of screen 99. In the case, the observer would see region R91, and have a full fiew of cart 75 and a partial view of caboose 76 and cart 74, but the rest of the train would remain hidden from view.

If the observer were to then move to location 92, then the observer's FOV would span 16 projectors, and he would thus have an even wider view of screen 99. In the present case, the observer would see carts 73 and 74 completely, and have a partial view of carts 72 and 75.

Thus, this configuration can create a very wide screen (i.e. or equivalently, create a very wide image), which makes it is particularly suited to displaying wide panoramic scenes in 3D, whose widths are wider than the FOV of any individual projector along the projection base line.

Figure 17:
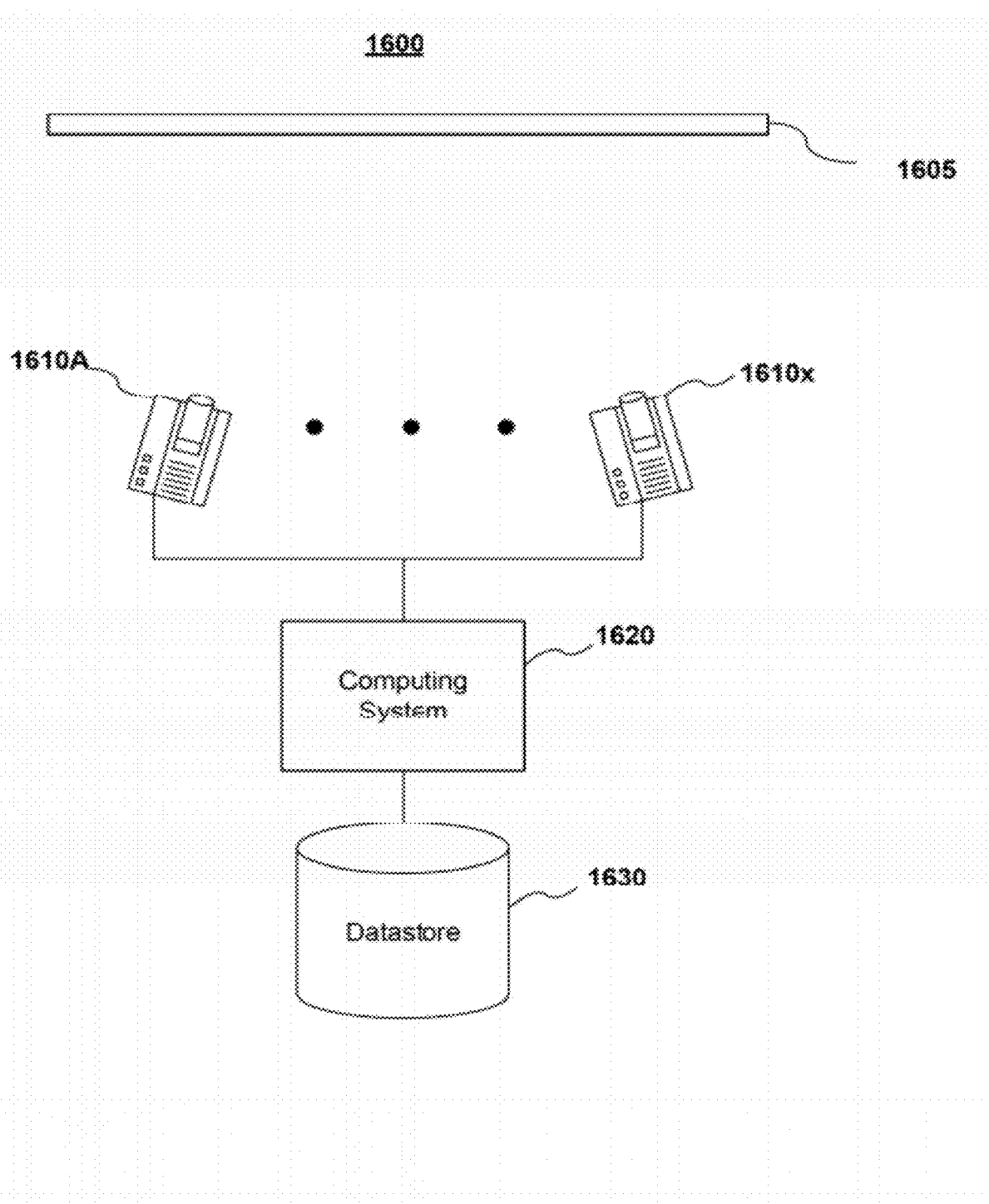
FIG. 17 illustrates a multi-projector display system.

FIG. 17 illustrates a multi-projector display system 1600 with at least one retro-reflective vertical light diffusion screen 1605 according to the present invention. The system comprises a retro-reflective light diffusion screen 1605 and a plurality of projectors 1610A to 1610x. In the depicted system 1600, the projectors 1610A-1610x may be under the control of a computing system 1620. The computing system may contain, or alternatively may be communicatively connected to, a datastore 1630 that stores a set of perspective images. The computing system 1620 coordinates the displaying of perspective views on the screen 1605 via the projectors 1610A-1610x to generate a multiscopic display.

It shall be noted that the present invention may be implemented using an instruction-execution/computing device or system capable of processing data, including without limitation, a general-purpose computer and a specific computer, such as one intended for data or image processing. The present invention may also be implemented with other computing devices and systems. Furthermore, aspects of the present invention may be implemented in a wide variety of ways including software, hardware, firmware, or combinations thereof. For example, the functions to practice various aspects of the present invention may be performed by components that are implemented in a wide variety of ways including discrete logic components, one or more application specific integrated circuits (ASICs), and/or program-controlled processors. It shall be noted that the manner in which these items are implemented is not critical to the present invention.

Figure 18:
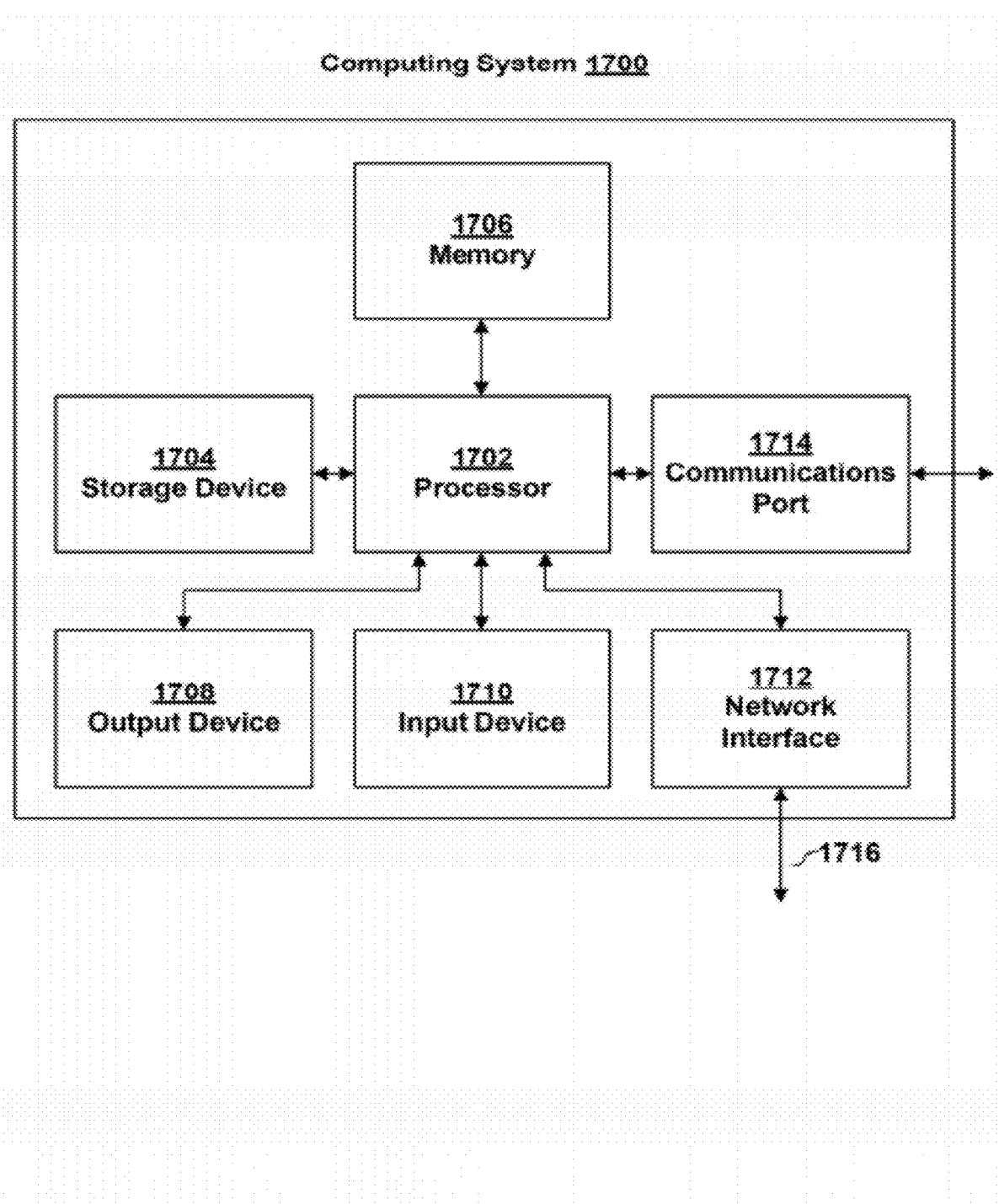
FIG. 18 depicts a block diagram of an example of a computing system.

FIG. 18 depicts a functional block diagram of an embodiment of an instruction-execution/computing device 1700 that may be implemented with embodiments of the present invention. As illustrated in FIG. 18, a processor 1702 executes software instructions and interacts with other system components. In an embodiment, processor 1702 may be a general purpose processor such as (by way of example and not limitation) an AMD processor, an INTEL processor, a SUN MICROSYSTEMS processor, or a POWERPC compatible-CPU, or the processor may be an application specific processor or processors. A storage device 1704, coupled to processor 1702, provides long-term storage of data and software programs. Storage device 1704 may be a hard disk drive and/or another device capable of storing data, such as a magnetic or optical media (e.g., diskettes, tapes, compact disk, DVD, and the like) drive or a solid-state memory device. Storage device 1704 may hold programs, instructions, and/or data for use with processor 1702. In an embodiment, programs or instructions stored on or loaded from storage device 1704 may be loaded into memory 1706 and executed by processor 1702. In an embodiment, storage device 1704 holds programs or instructions for implementing an operating system on processor 1702. In embodiments, possible operating systems include, but are not limited to, UNIX, AIX, LINUX, Microsoft Windows, and the Apple MAC OS. In embodiments, the operating system executes on, and controls the operation of, the computing system 1700. If desired, storage 1704 may be implemented as Datastore 1630 of FIG. 17.

An addressable memory 1706, coupled to processor 1702, may be used to store data and software instructions to be executed by processor 1702. Memory 1706 may be, for example, firmware, read only memory (ROM), flash memory, non-volatile random access memory (NVRAM), random access memory (RAM), or any combination thereof. In one embodiment, memory 1706 stores a number of software objects, otherwise known as services, utilities, components, or modules. One skilled in the art will also recognize that storage 1704 and memory 1706 may be the same items and function in both capacities. In an embodiment, one or more of the software components or modules may be stored in memory 1704, 1706 and executed by processor 1702.

In an embodiment, computing system 1700 provides the ability to communicate with other devices, other networks, or both. Computing system 1700 may include one or more network interfaces or adapters 1712, 1714 to communicatively couple computing system 1700 to other networks and devices. For example, computing system 1700 may include a network interface 1712, a communications port 1714, or both, each of which are communicatively coupled to processor 1702, and which may be used to couple computing system 1700 to other computer systems, networks, and devices.

In an embodiment, computing system 1700 may include one or more output devices 1708, coupled to processor 1702, to facilitate displaying graphics and text. Output devices 1708 may include, but are not limited to, a projector, a display, LCD screen, CRT monitor, printer, touch screen, or other device for displaying information. Computing system 1700 may also include a graphics adapter (not shown) to assist in displaying information or images on output device 1708.

One or more input devices 1710, coupled to processor 1702, may be used to facilitate user input. Input device 1710 may include, but are not limited to, a pointing device, such as a mouse, trackball, or touchpad, and may also include a keyboard or keypad to input data or instructions into computing system 1700.

In an embodiment, computing system 1700 may receive input, whether through communications port 1714, network interface 1712, stored data in memory 1704/1706, or through an input device 1710, from a scanner, copier, facsimile machine, or other computing device.

One skilled in the art will recognize no computing system is critical to the practice of the present invention. One skilled in the art will also recognize that a number of the elements described above may be physically and/or functionally separated into sub-modules or combined together.

It shall be noted that embodiments of the present invention may further relate to computer products with a computer-readable medium that have computer code thereon for performing various computer-implemented operations. The media and computer code may be those specially designed and constructed for the purposes of the present invention, or they may be of the kind known or available to those having skill in the relevant arts. Examples of computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a computer. Examples of program modules include libraries, programs, routines, objects, components, and data structures. In distributed computing environments, program modules may be physically located in settings that are local, remote, or both.

While the invention has been described in conjunction with several specific embodiments, it is evident to those skilled in the art that many further alternatives, modifications, and variations will be apparent in light of the foregoing description. Thus, the invention described herein is intended to embrace all such alternatives, modifications, applications and variations as may fall within the spirit and scope of the appended claims.

What is claimed is:

1. A system for creating a 3D panoramic projected image, comprising:
   a plurality of projectors along a line where the projector at a starting end of said line is a starting projector and the projector at the opposite end of said line is an ending projector, said plurality of projectors defining a projection baseline, each projector in said plurality of projectors provides a shifted view of a common subject from a different view angle;

a screen having a width wider than the field-of-view any individual projector in said plurality of projectors;

wherein:

the projectors are arranged so that each projector that lies between the starting projector and the ending projector provides a first image that is fully covered on said screen with partial image overlaps from other projected images from more than one of said plurality of projectors;

the projected images from each adjacent projector along said projection baseline are shifted along a common direction on said screen;

said first image forms a stereo-pair-of-images with any of the other projected images that has an overlapping region with it to create a local 3D projected image;

said screen is a retro-reflective vertical light diffusion screen having a vertical dimension and a horizontal dimension, a retro-reflective layer for reflecting light rays at substantially their incident angle; and a vertical light diffusion screen for receiving each reflected image from the retro-reflective layer and providing high image diffusion along said vertical dimension and minimal diffusion along said horizontal dimension so as to produce a distinct viewing window elongated along said vertical dimension for each reflected image;

said plurality of projectors are generally arranged along the horizontal dimension and positioned to project onto said retro-reflective vertical light diffusion screen;

the width of the vertical slit of each viewing window corresponding to a given projector is a function of the horizontal diffusion angle of the retro-reflective vertical light diffusion screen, the distance from the retro-reflective vertical light diffusion screen to the given projector, and the aperture size of the given projector's projection lens, said function defining the following relation for the width of the vertical slit:

$$W = D_a + 2 \cdot Z_p \cdot \tan\left(\frac{\varpi}{2}\right),$$

where

W is the width of the vertical slit;

$D_a$ is the aperture size of the given projector's projection lens;

$Z_p$ is the distance from the projector to the retro-reflective vertical light diffusion screen; and $\varpi$ is the horizontal diffusion angle of the retro-reflective vertical light diffusion screen.

2. The system of claim 1, wherein an image projected by any one of said plurality of projectors spans a fraction of the width of said screen, and the partial image overlaps from all of said plurality of projectors create a continuous composite 3D image substantially spanning the width of said screen.

3. The system of claim 2, wherein said fraction is does not span the width of said composite image.

4. The system of claim 1, wherein each projector in said plurality of projectors provides a distinct image of a common subject, each distinct image providing a different view angle of said subject.

5. The system of claim 1 wherein no two projectors in said plurality of projectors provide the same image.

6. The system of claim 1, wherein the partially, overlapped images are of equal size.

7. The system of claim 1, wherein the projected image from each adjacent projector along said projection baseline are shifted by a common fixed amount along said common direction on said screen.

8. The system of claim 1, wherein optical axis of each said plurality of projectors is normal to said screen.

9. The system of claim 8, wherein said plurality of projectors are equadistant to said screen along a direction normal to said screen.

10. A system for creating a 3D panoramic projected image, comprising:

a plurality of projectors along a line where the projector at a starting end of said line is a starting projector and the projector at the opposite end of said line is an ending projector, said plurality of projectors defining aprojection baseline, each projector in said plurality of projectors provides a shifted view of a common subject from a different view angle;

a screen having a width wider than the field-of-view any individual projector in said plurality of projectors;

wherein:

the projectors are arranged so that each projector that lies between the starting projector and the ending projector provides a first image that is fully covered on said screen with partial image overlaps from other projected images from more than one of said plurality of projectors;

the projected images from each adjacent projector along said projection baseline are shifted along a common direction on said screen;

said first image forms a stereo-pair-of-images with any of the other projected images that has an overlapping region with it to create a local 3D projected image; and each projector in said projection baseline creates respective viewing window sized to permit viewing of its projected image by only one of a human observer's two eyes, said viewing window having a far limit beyond which the projected image is not fully visible through said viewing window;

said system establishing a viewing volume combining a plurality of adjacent viewing windows from where an observer may view said screen beyond said far limit line, D, defined as $$D = \frac{d \times IPD}{W}$$

where:

W is the width of the viewing window;

IPD is Inter-pupillary Distance of said observer; and d is the distance from said projection baseline to said screen.

11. The system of claim 1, wherein said shifted views are parallel to each other.

12. The system of claim 1, wherein said local 3D projected image is formed within said overlapping region.

13. The system of claim 12, wherein more than one projected image from more than one projector shares at least part of said overlapping region with said first image.

14. The system of claim 12 wherein said more than one of said overlapping region excludes at least one of said starting projector and ending projector.

15. The system of claim 1, wherein the photometric properties of all projected images from said plurality of projectors are isolated from each other on said screen.

16. The system of claim 1, each projector within said plurality of projectors forms a first stereo pair with the adjacent projector on its left and forms second stereo pair with the adjacent projector on its right.

17. The system of claim 1, wherein said light diffuser is a one-dimensional light diffuser, and each of said plurality of projectors projects its respective image in its entirety as a single projection image.

18. The system of claim 1, wherein each reflected image's viewing window is a vertical slit centered on the aperture of its corresponding projector's projection lens.

\* \* \* \* \*